W. F. BLEECKER AND W. L. MORRISON.
PROCESS OF PRODUCING ALKALI EARTH METALS.
APPLICATION FILED OCT. 19, 1915.
1,311,378.
Patented July 29, 1919.
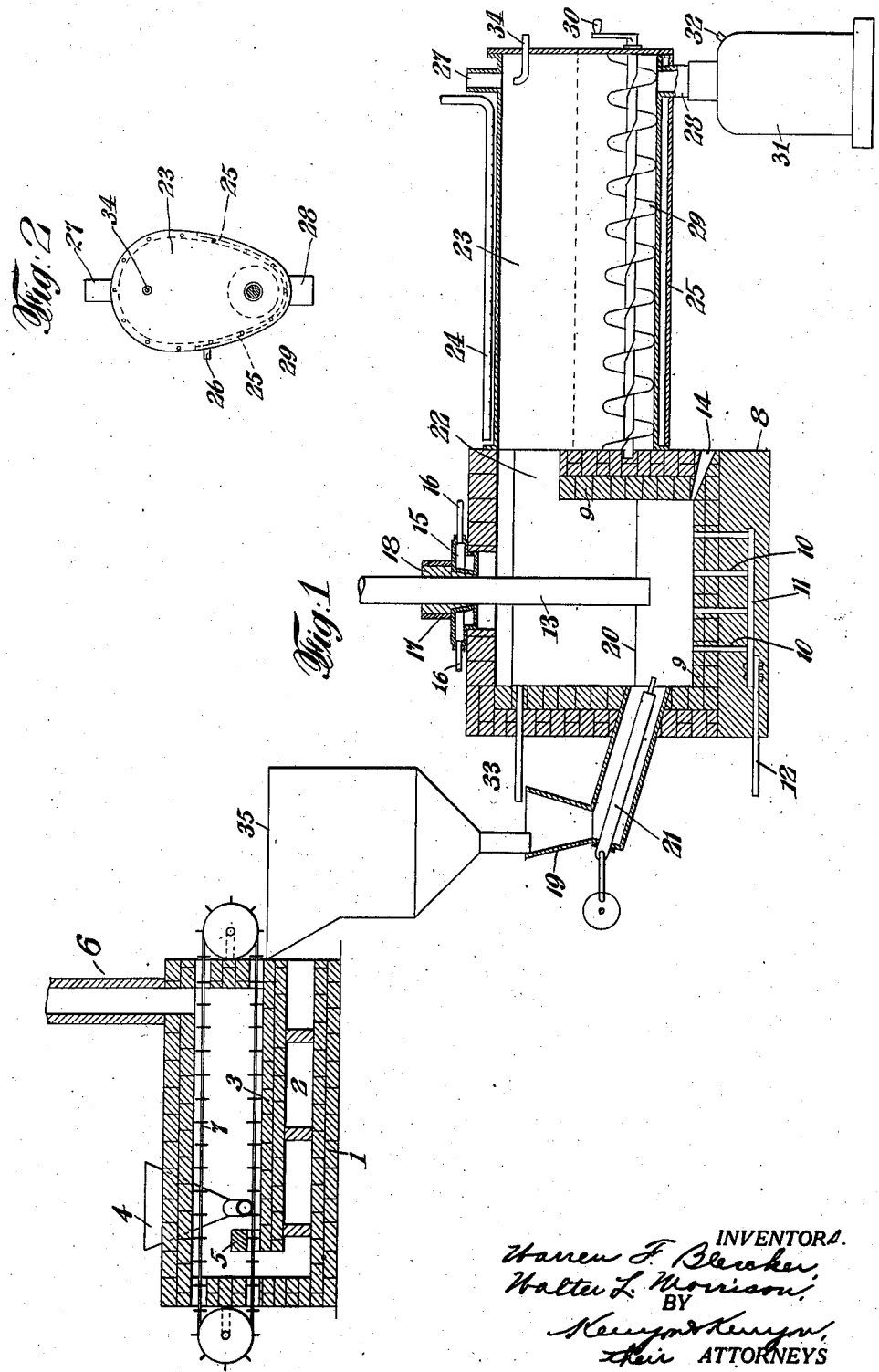
INVENTORS.
Warren F. Bleecker
Walter L. Morrison
BY
Kenyon & Kenyon
their ATTORNEYS

UNITED STATES PATENT OFFICE.

WARREN F. BLEECKER AND WALTER L. MORRISON, OF CANONSBURG, PENNSYLVANIA, ASSIGNORS TO ELECTRIC REDUCTION COMPANY, A CORPORATION OF DELAWARE.

PROCESS OF PRODUCING ALKALI-EARTH METALS.

1,311,378.     Specification of Letters Patent.     Patented July 29, 1919.

Application filed October 19, 1915. Serial No. 56,734.

*To all whom it may concern:*

Be it known that we, WARREN F. BLEECKER and WALTER L. MORRISON, both citizens of the United States, residing at Canonsburg, county of Washington, State of Pennsylvania, have invented certain new and useful Improvements in Processes of Producing Alkali-Earth Metals, of which the following is a specification.

Our invention relates to processes of producing alkali earth metals. The main object is to provide a simple, cheap and efficient process, by which such metals can be obtained in solid or liquid form, with great ease and rapidity. More specific objects will more clearly appear from the detailed description given below, taken in connection with the accompanying drawing, which illustrates one form of apparatus for carrying out the process, and which forms a part of this specification.

While the invention is applicable to the production of various of the alkali earth metals, it is especially advantageous for the production of magnesium in solid or liquid form. In order to illustrate our invention, we will therefore describe in detail the process for the production of magnesium, which embodies our improvements in one form.

We take magnesium containing material, preferably magnesium oxid containing material, such as magnesite or dolomite and if the materials have not already been suitably calcined, they are then placed in a reverberatory furnace and heated, so as to remove moisture therefrom and to break up any carbonates which may be present and so remove deleterious oxidizing components therefrom. With this calcined material in crushed form we mix a suitable reducing agent, preferably a metalloid reducing agent, such as crushed silicon or granulated metallic aluminum, or both. By the term metalloid reducing agent, we mean a reducing agent or agents forming fusible slags which are substantially unvolatilized or undecomposed at the working temperature of the furnace and which are capable of not only depriving magnesium of oxygen at a temperature above 1200° C., but likewise are capable of retaining oxygen in the slag at a temperature below 1200° C. Under certain circumstances, other reducing agents may be used. The reducing agent is mixed with the magnesium oxid containing material in substantially molecular proportions, according to the formulas $$3MgO + 2Al = 3Mg + Al_2O_3$$
$$2MgO + Si = 2Mg + SiO_2$$

We then preferably add 25 per cent. excess (of the alkali earth metal oxid) of magnesium oxid or its equivalent, calcium oxid, preferably partly both, to promote fluidity when the mixture is later reduced to molten slag. 5 to 10 per cent. (of the total alkali earth oxid) of fluorspar $CaF_2$, or silicon, Si, may also be added to thin the slag and make a better flux, especially if aluminum is used as the reducing agent. If silicon is used it promotes the fluidity of the resultant slag and it may be used more or less without special flux or used with aluminum to improve the fluidity of the slag. The mixture, preferably hot, is then transferred or fed to an electric furnace, preferably alternating current, in which it is fused. The voltage of the electric furnace will, of course, vary with the nature of the slag, &c., but in some instances, we have found a voltage in the neighborhood of 40 or 50 volts suitable. The electric furnace is preferably of the conducting hearth type with the bottom or wall of the furnace forming one electrode, while the other electrode or electrodes are adapted to have their ends immersed in the molten mixture or bath. The bottom or wall of the furnace, which forms one electrode, is preferably constructed of magnesite brick (although carbon material may be used) with suitable metallic contacting members leading thereinto. The current passing from one electrode to another heats the mixture and fuses it. We have found in certain mixtures a temperature of 1300° to 1500° C. is sufficient to produce a molten mixture. Due to the high heat, the magnesium oxid reacts with the aluminum or silicon or both, and metallic magnesium is volatilized, forming vapors thereof. These magnesium vapors are then conducted into a condenser and condensed to form metallic magnesium in solid or liquid form. If condensed very rapidly, that is, suddenly chilled, the magnesium vapors condense to form a fine powder, mostly impalpable and of dark color, having generally the characteristics that it is incapable of being fused together to form a liquid and that it is amorphous and nodular in form and has superficial impurities. By condensing them quickly, in this way, if there is any carbon monoxid present in the gases, there is a tendency to prevent it reacting with the magnesium, causing the magnesium to be changed back with the oxid. If the volatilized magnesium is cooled slowly in a suitable atmosphere, it collects in an agglomerated form, rather than in the form of a fine powder.

The operation may be made substantially continuous, fresh portions of the mixture from the reverberatory or preheating furnace being fed either continuously or from time to time into the electric furnace, and the condensed magnesium or other alkali earth metal being removed either continuously or from time to time, from the condenser.

The slag formed in the electric furnace is tapped off from time to time. This slag preferably consists of the oxids of magnesium, calcium, silicon and aluminum, in varying proportions.

It is important that air be excluded from the electric furnace and condenser and in order to prevent the magnesium vapors from oxidizing, to produce oxid of magnesium, care is taken that the atmosphere in both the electric furnace and condenser is free from air or its constituents, and contains as little as possible of carbon monoxid or other gas readily decomposed or acted upon by magnesium or its vapors. The atmosphere should be substantially non-oxidizing. This may be done by either driving the electric furnace so rapidly that some magnesium vapor is expelled, or else by providing a working atmosphere of hydrogen or other inert gas. Preferably a combination of the two methods is employed, in the sense that the apparatus is supplied with sufficient inert gas, such as hydrogen, to avoid a material loss of magnesium vapor and at the same time, without permitting air to be sucked in at the condenser outlet.

With some of the reducing agents it may be desirable to reduce the pressure of the atmosphere as to render it substantially inert, but avoiding the use of a vacuum.

The magnesium, particularly when condensed in the form of a fine powder, should be cooled before removing it from the neutral atmosphere to such an extent as to prevent any rapid surface oxidation thereof, which would cause the powder to heat up and superinduce active combustion thereof. We preferably cool it below 40° C., before removing it from the neutral atmosphere. It may, however, be removed from the condenser and put into any suitable receptacle, even before being so cooled, by keeping it in a neutral atmosphere during such transfer.

In the drawing Fig. 1 illustrates diagrammatically, and largely in section, an apparatus adapted to carry out the improved process, and Fig. 2 is an end view of the condenser shown in Fig. 1.

Referring to the drawing, 1 represents the preheating furnace, which is of the reverberatory type, the hot gases being introduced at 2, below the hearth 3. The alkali earth containing material is introduced through a hopper 4 on the hearth 3. The hot gases pass up around wall 5 and heat the materials, after which the gases pass out through a stack 6. A suitable conveyer 7 is provided for gradually moving the materials along the hearth 3 and out into the hopper 35, wherein they may be mixed with the reducing agent. The alternating current electric furnace is shown at 8, having its inner walls lined with magnesite bricks 9, which contain one electrode of the furnace, this being shown as a series of iron pins or rods 10 which project up into the lining 9, these pins being connected with common iron conductor 11, which, in turn, is connected to a copper conductor 12. An opening 14 is provided at the bottom of the furnace, from which the slag may be tapped, as desired. The other electrode is shown at 13, and may be a rod of graphite or other suitable material. The electrode 13 is inserted through the top of the furnace and is surrounded by a water jacket 15, through which water is circulated by means of inlet and outlet pipes 16. Above the jacket 15 a ring 17 surrounds the electrode, which ring is packed with asbestos packing 18, in order that the furnace may be made substantially air-tight.

The hopper 35 discharges into a chute 19, which enters the electric furnace substantially below the surface of the bath, which surface is indicated in the drawing by the line 20. In order that the mixed materials may be conveniently injected into the bath, chute 19 is provided with a reciprocating plunger 21, operated from any suitable source of power, so as to push the material from the chute 19 into the molten bath, as desired. The end of electrode 13 is immersed in the bath 20, so that both electrodes of the furnace are in contact with the molten bath. In this way the heating action is due largely to the resistance of the bath to the current passing therethrough rather than to an arc between the bath and electrode 13, so that a more uniform and desirable heating action is produced.

The outlet of the electric furnace for the vapors and gases is shown at 22. This leads directly to a horizontal condenser 23, oval in cross section, as shown in Fig. 2, although, if desired, the top or wall of the furnace or other suitable surface may be used. In the form shown, there extends centrally along the top of condenser 23, a cold water pipe 24, which discharges cold water on top of the condenser in such manner that it runs down over both sides thereof. The lower half of the condenser is inclosed by a water jacket 25, and the water running down over the outer surface of the condenser is collected in this water jacket and may overflow therefrom through an outlet pipe 26. The condenser may be provided with an outlet for gases or vapors at 27, and an outlet for the condensed magnesium or other alkali earth metal at 28, or the gases may also be forced to exit through the outlet 28. In order that the condensed magnesium may be easily removed through the outlet 28, a worm or screw 29 is provided, which may be turned by handle 30, so as to force the material along the bottom of the condenser to and through the outlet 28. The material may be allowed to fall into cans or other receptacles, one of which is shown at 31. These receptacles may be provided with gas inlets 32, through which inert gas may be injected in order to fill the receptacle with gas, so that when the condensed magnesium is deposited in the receptacle, there is no danger of rapid surface oxidation thereof. By observing or testing the gases which flow from the exit 27, if any, it may be determined whether the condensing action is sufficient. In order to make sure that the atmosphere in the furnace and condenser is non-oxidizing, and to keep the furnace and atmosphere free from air or its constituents, inlet pipes 33 and 34 may be provided, through either or both of which hydrogen or other inert gas may be injected into the furnace and condenser in an amount sufficient to prevent any material amount of air being sucked in through the outlet 27, by reason of the suction produced by the condensing action.

Although we have explained our invention in great detail, with respect to one embodiment thereof, we do not desire to be limited to such details, as many changes and modifications may be made therein without departing from the spirit and scope of our invention in its broader aspects, as for instance, the condenser may be so operated as to deliver fluid metal.

Having fully and clearly described our improvements, what we claim as new and desire to secure by Letters Patent is:

1. The improved process of producing magnesium which consists in heating magnesium oxid with a reducing agent to produce magnesium vapors and condensing them in an inert atmosphere to produce metallic magnesium.

2. The improved process of producing magnesium which consists in heating magnesium oxid with a metalloid reducing agent to produce magnesium vapor and condensing the vapor to produce metallic magnesium.

3. The improved process of producing alkali earth metals which consists in heating the oxids thereof in the presence of a reducing agent to produce alkali earth metal vapors and condensing them in a non-oxidizing atmosphere to the solid or liquid state.

4. The improved process of producing alkali earth metals which consists in heating the oxids thereof in the presence of a metalloid reducing agent in an unevacuated atmosphere to produce alkali earth metal vapors and condensing them to the solid or liquid state in an unevacuated atmosphere.

5. The process of producing alkali earth metals which consists in heating material containing alkali earth metal oxid or oxids to remove moisture and decompose carbonates, if present therein, then further heating the material with a reducing agent to volatilize the alkali earth metal and condensing the volatilized alkali earth metal to the solid or liquid state.

6. The process of producing alkali earth metals which consists in heating material containing alkali earth metal oxid or oxids to remove moisture and decompose carbonates, if present therein, then further heating the material with a metalloid reducing agent to volatilize the alkali earth metal and condensing the volatilized earth metal in an inert atmosphere to the solid or liquid state.

7. The process of producing magnesium which consists in heating magnesium oxid containing material, to remove moisture and decompose carbonates, if present, then further heating the material in the presence of a reducing agent to volatilize the magnesium and condensing the magnesium vapor so volatilized to produce metallic magnesium.

8. The process of producing magnesium which consists in heating magnesium oxid containing material, to remove moisture and decompose carbonates, if present, then further heating the material in the presence of a metalloid reducing agent to volatilize the magnesium and condensing the magnesium vapor so volatilized to produce magnesium in a solid or liquid state.

9. The process of producing magnesium which consists in heating magnesium oxid containing material to remove moisture and decompose carbonates, if present, then further heating the material in the presence of a reducing agent to volatilize the magnesium and condensing the magnesium vapor so volatilized, in a non-oxidizing atmosphere, to produce magnesium in a solid or liquid state.

10. The process of producing magnesium which consists in heating a material containing magnesium oxid to remove moisture therefrom and decompose oxidizing substances, then heating a mixture of the magnesium oxid containing material and a metalloid reducing agent to a temperature sufficient to produce magnesium vapors and then condensing the said vapors to produce metallic magnesium in a solid or liquid state.

11. The process of producing alkali earth metals which consists in heating a mixture of alkali earth oxid containing material to remove moisture and decompose oxidizing substances if present therein, then fusing and reducing the material at a temperature sufficient to volatilize alkali earth metal therefrom, then cooling the vapors to produce the alkali earth metal in a solid or liquid state.

12. The process of producing alkali earth metals which consists in heating a mixture of alkali earth oxid containing material to remove moisture and decompose oxidizing substances, if present therein, then heating the material in the presence of a reducing agent to a temperature sufficient to volatilize alkali earth metal therefrom, and then cooling the vapors in a non-oxidizing atmosphere to produce the alkali earth metal in a solid or liquid state.

13. The process of producing alkali earth metal from compounds thereof, which consists in reducing and heating a compound thereof in an unevacuated atmosphere sufficiently to volatilize the metal to form vapors thereof and then condensing the vapors to produce the alkali earth metal in a solid or liquid state.

14. The process of producing alkali earth metal which consists in fluxing and reducing an oxid thereof to separate the oxygen from the metal and collecting the metal in a solid or liquid state.

15. The improved process of producing magnesium which consists in fluxing a magnesium oxid containing material in the presence of a reducing agent to separate the magnesium from its oxygen and collecting the magnesium in solid or liquid form.

16. The process of producing alkali earth metal which consists in fluxing and reducing a material containing the metal and volatilizing the metal to produce vapors thereof and then cooling the vapors so quickly as to produce the metal in a solid state in the form of a fine powder.

17. The process of producing magnesium which consists in fluxing and reducing magnesium oxid containing material, to volatilize the magnesium and produce vapors thereof and then cooling the vapors so rapidly as to produce the magnesium in a solid state in the form of a fine powder.

18. The process of producing alkali earth metal which consists in fluxing a material containing an oxid of the metal and a metalloid reducing agent and volatilizing the metal to produce vapors thereof and then cooling the vapors in a non-oxidizing atmosphere so quickly as to produce the metal in a solid state in the form of a fine powder.

19. The process of producing alkali earth metal which consists in fusing an alkali earth metal compound, by means of an electric current with the material forming part of the electric circuit, to flux away the other constituent of the compound and separating the metal constituent to produce the metal in solid or liquid form.

20. The process of producing alkali earth metal which consists in fusing an alkali earth metal oxid containing material, in the presence of a reducing agent, and slagging away the combined oxygen and separating the metal in solid or liquid form.

21. The process of producing magnesium which consists in fusing magnesium oxid in the presence of a metalloid reducing agent by means of an electric current, with the material forming part of the electric circuit to produce metallic magnesium vapors and then condensing the vapors in a non-oxidizing atmosphere to produce metallic magnesium in a solid or liquid state.

22. The process of producing alkali earth metal which consists in fusing and reducing an alkali earth metal containing material in a furnace in a non-oxidizing atmosphere, to volatilize the metal and produce vapors thereof and then condensing the vapors to reduce the metal to solid or liquid form.

23. The process of producing alkali earth metal which consists in fusing and reducing alkali earth metal oxid containing material in a furnace in a non-oxidizing atmosphere to volatilize the metal and produce vapors thereof, and then condensing the vapors in a non-oxidizing atmosphere to reduce the metal to solid or liquid form.

24. The process of producing magnesium which consists in fusing magnesium oxid in the presence of a reducing agent in a non-oxidizing atmosphere to vaporize the magnesium and condensing the vapors in a non-oxidizing atmosphere to produce metallic magnesium.

25. The process of producing alkali earth metal which consists in reducing and heating a material containing a compound thereof sufficiently to volatilize the metal to form vapors thereof and then condensing the vapors in a non-oxidizing atmosphere to produce the alkali earth metal in a solid or liquid state.

26. The process of producing alkali earth metal, which consists in fluxing and reducing a material containing an oxid thereof, volatilizing the metal to produce vapors thereof and condensing the vapors in a non-oxidizing atmosphere to produce the metal in a solid or liquid state.

27. The process of producing alkali earth metal which consists in reducing and fusing an alkali earth metal containing material, by an electric current with the material participating in the electric circuit to volatilize the metal to produce vapors thereof and then condensing the vapors to produce the metal in solid or liquid form.

28. The process of producing alkali earth metal which consists in fusing an alkali earth metal oxid containing material, in the presence of a reducing agent by an electric current with the material participating in the electric circuit to volatilize the metal to produce vapors thereof, and then condensing the vapors to produce the metal in solid or liquid form.

29. The process of producing alkali earth metal which consists in reducing and fusing an alkali earth metal compound and slagging away the other combined constituent of the compound and separating the metal constituent to produce the alkali earth metal in solid or liquid form.

30. The process of producing alkali earth metal which consists in reducing and fusing an alkali earth metal compound and slagging away the other constituent of the compound and separating the metal constituent in a hydrogen atmosphere to produce the alkali earth metal in solid or liquid form.

31. The process of producing alkali earth metal which consists in heating and reducing a material containing alkali earth metal to volatilize the metal and condensing the same in a hydrogen atmosphere.

32. The process of producing alkali earth metals which consists in heating alkali earth metal and oxygen combined containing material to remove moisture and decompose oxidizing substances therein and fluxing and reducing the material to separate the oxygen from the metal and collecting the metal in a hydrogen atmosphere in a solid or liquid state.

In testimony whereof we have signed our names to this specification.

WARREN F. BLEECKER.
W. L. MORRISON.